US010778678B2

(12) United States Patent
Song et al.

(10) Patent No.: US 10,778,678 B2
(45) Date of Patent: Sep. 15, 2020

(54) IDENTITY IDENTIFICATION AND PREPROCESSING

(71) Applicant: Alibaba Group Holding Limited, George Town (KY)

(72) Inventors: Yitao Song, Hangzhou (CN); Mian Huang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/805,269

(22) Filed: Feb. 28, 2020

(65) Prior Publication Data

US 2020/0204548 A1 Jun. 25, 2020

Related U.S. Application Data

(63) Continuation of application No. PCT/CN2020/071348, filed on Jan. 10, 2020.

(30) Foreign Application Priority Data

Jul. 18, 2018 (CN) .......................... 2019 1 0651274

(51) Int. Cl.
*H04L 29/06* (2006.01)
*H04W 12/06* (2009.01)

(52) U.S. Cl.
CPC ......... *H04L 63/0861* (2013.01); *H04W 12/06* (2013.01)

(58) Field of Classification Search
CPC .. H04L 63/0861; H04W 12/06; H04W 64/00; G06Q 2220/00
See application file for complete search history.

(56) References Cited

U.S. PATENT DOCUMENTS 10,231,128 B1 * 3/2019 Ziraknejad ............ H04L 9/0825
2013/0081119 A1 * 3/2013 Sampas .............. G06Q 20/3224
726/7

(Continued)

FOREIGN PATENT DOCUMENTS

| CN | 105930765 | 9/2016 |
| CN | 106131044 | 11/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Shanto Abedin
(74) *Attorney, Agent, or Firm* — Fish & Richardson P.C.

(57) ABSTRACT

Identity identification preprocessing methods and systems, and identity identification methods and systems are disclosed. After any user carries a mobile device to a predetermined nearby area of a biometric feature collection device, the mobile device of the user receives a wireless signal broadcast by the biometric feature collection device. The wireless signal triggers the mobile device to upload an auxiliary identification factor other than a biometric feature of the owner and an identity of the owner to an identification server. The identification server establishes a mapping relationship between the received identity and the received auxiliary identification factor. After subsequently obtaining a collected biometric feature uploaded by the biometric feature collection device, the identification server can perform two-factor-based user identity identification based on the previously established mapping relationship and the collected biometric feature.

21 Claims, 5 Drawing Sheets

(56) References Cited

U.S. PATENT DOCUMENTS

2017/0048228 A1* 2/2017 Leow .................. H04B 1/385
2017/0093841 A1   3/2017 DeLuca et al.

FOREIGN PATENT DOCUMENTS

CN   107122977    9/2017
CN   107483416    12/2017

OTHER PUBLICATIONS

Nakamoto, "Bitcoin: A Peer-to-Peer Electronic Cash System," www.bitcoin.org, 2005, 9 pages.

* cited by examiner

IDENTITY IDENTIFICATION AND PREPROCESSING

CROSS-REFERENCE TO RELATED APPLICATIONS

This application is a continuation of PCT Application No. PCT/CN2020/071348, filed on Jan. 10, 2020, which claims priority to Chinese Patent Application No. 201910651274.X, filed on Jul. 18, 2019, and each application is hereby incorporated by reference in its entirety.

TECHNICAL FIELD

Implementations of the present specification relate to the field of information technologies, and in particular, to identity identification preprocessing methods and systems, and identity identification methods and systems.

BACKGROUND

Currently, an identity identification method based on a biometric feature (for example, a facial feature) is relatively popular.

In practice, when identity identification is performed on a user, in one aspect, a biometric feature collection device needs to collect a biometric feature (which is referred to as a collected biometric feature in the present specification and can be considered as a primary identification factor) of the user, and uploads the collected biometric feature to a server. In another aspect, to improve accuracy of identity identification, the user further needs to provide an auxiliary identification factor (for example, a password or a verification code) to the server. For example, the user needs to input a password associated with an identity of the user to the biometric feature collection device, and the biometric feature collection device uploads the collected biometric feature and the password to the server.

Next, the server performs identify identification for a collected biometric feature of a to-be-identified user. If an identity is identified, and the auxiliary identification factor passes validity verification (for example, a password provided by the user is consistent with a determined registration password associated with the identity), the server finally determines that an identity of the to-be-identified user is the determined identity.

However, the existing identity identification method is not convenient enough for the user.

SUMMARY

To improve convenience of an identity identification method, implementations of the present specification provide an identity identification preprocessing methods and systems, and identity identification methods and systems. Technical solutions are as follows:

According to a first aspect of the implementations of the present specification, an identity identification preprocessing method is provided, where a biometric feature collection device broadcasts a wireless signal to a predetermined nearby area of the biometric feature collection device, and the method includes: after entering the predetermined nearby area, uploading, by a mobile device of a user, an auxiliary identification factor other than a biometric feature of the owner and an identity of the owner to an identification server based on the received wireless signal; and establishing, by the identification server, a mapping relationship between the auxiliary identification factor and the identity, where the mapping relationship is used to perform biometric feature-based identity identification on the owner at the biometric feature collection device.

According to a second aspect of the implementations of the present specification, an identity identification method based on the first aspect is provided, including: collecting, by a biometric feature collection device, a biometric feature of a to-be-identified user as a collected biometric feature, and uploading the collected biometric feature to an identification server; determining, by the identification server, a registered biometric feature matching the collected biometric feature, and determining an identity associated with the matched registered biometric feature; and identifying, by the identification server, an identity of the to-be-identified user as the identity if the identification server determines, based on a pre-established mapping relationship, that an auxiliary identification factor corresponding to the identity exists and that the auxiliary identification factor has passed validity verification.

According to a third aspect of the implementations of the present specification, an identity identification preprocessing system is provided, including a biometric feature collection device and an identification server, where the biometric feature collection device is configured to broadcast a wireless signal to a predetermined nearby area of the biometric feature collection device, so that after entering the predetermined nearby area, a mobile device of a user uploads an auxiliary identification factor other than a biometric feature of the owner and an identity of the owner to the identification server based on the received wireless signal; and the identification server is configured to establish a mapping relationship between the auxiliary identification factor and the identity, where the mapping relationship is used to perform biometric feature-based identity identification on the owner at the biometric feature collection device.

According to a fourth aspect of the implementations of the present specification, an identity identification system based on the first aspect is provided, including a biometric feature collection device and an identification server, where the biometric feature collection device is configured to: collect a biometric feature of a to-be-identified user as a collected biometric feature, and upload the collected biometric feature to the identification server; and the identification server is configured to: determine a registered biometric feature matching the collected biometric feature, determine an identity associated with the matched registered biometric feature, and identify an identity of the to-be-identified user as the identity if the identification server determines, based on a pre-established mapping relationship, that an auxiliary identification factor corresponding to the identity exists and that the auxiliary identification factor has passed validity verification.

In the technical solutions provided in the implementations of the present specification, after any user carries a mobile device to a predetermined nearby area of a biometric feature collection device, the mobile device of the user receives a wireless signal broadcast by the biometric feature collection device. The wireless signal triggers the mobile device to upload an auxiliary identification factor other than a biometric feature of the owner and an identity of the owner to an identification server. The identification server establishes a mapping relationship between the received identity and the received auxiliary identification factor. After subsequently obtaining a collected biometric feature uploaded by the biometric feature collection device, the identification server can perform two-factor-based user identity identification based on the previously established mapping relationship and the collected biometric feature.

In the implementations of the present specification, before the user enters an identity identification procedure, the identification server can obtain the auxiliary identification factor of the user without awareness of the user. After the user enters the identity identification procedure, the user only needs to cooperate with the biometric feature collection device to collect the biometric feature, and does not need to manually perform an operation of providing the auxiliary identification factor, which is more convenient for the user.

It should be understood that the previous general description and the following detailed description are merely examples and explanations, and are not intended to limit the implementations of the present specification.

In addition, none of the implementations in the present specification implementation needs to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

Figure 1:
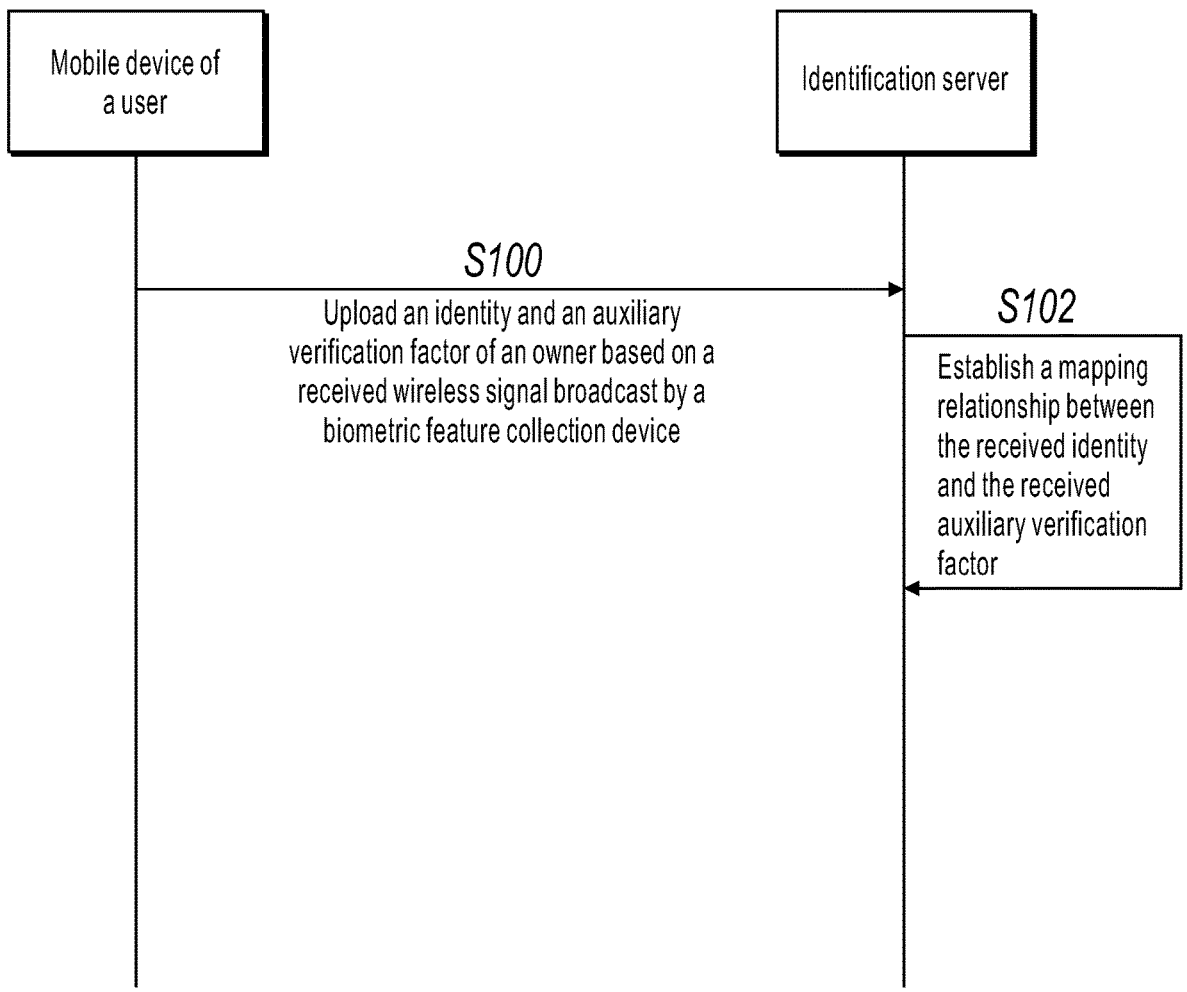
FIG. 1 is a schematic flowchart illustrating an identity identification preprocessing method, according to an implementation of the present specification.

In an existing identity identification method based on two factors (a biometric feature and an auxiliary identification factor), after a user enters an identity identification procedure (that is, after the user reaches a location of a biometric feature collection device), the user is required to provide both a biometric feature and an auxiliary identification factor (such as a password or a verification code) of the user to the biometric feature collection device. As such, the biometric feature collection device can upload the collected biometric feature and the auxiliary identification factor of the same user to an identification server in a binding form, so that the identification server can perform two-factor-based identity identification. However, in this method, operations of the user are relatively cumbersome and not convenient enough.

To solve this, in the implementations of the present specification, before the user enters the identity identification procedure (that is, before the user reaches the location of the biometric feature collection device is), a mobile device of the user binds an identity and an auxiliary identification factor of the user through a channel between the user and the identification server without awareness of the user. After the user enters the identity identification procedure, the user only needs to cooperate with the biometric feature collection device to collect the biometric feature. As such, the identification server can determine an associated identity based on the obtained collected biometric feature, and further correspond the collected biometric feature and the auxiliary identification factor to the same user with reference to a previously established mapping relationship between an identity and an auxiliary identification factor, so as to implement two-factor-based user identity identification.

In the implementations of the present specification, the user omits an operation of manually providing the auxiliary identification factor during identity identification, which is more convenient for the user. In addition, because an operation of the user is omitted, an identity identification speed is accelerated, and the user does not need to spend too much time at the biometric feature collection device.

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The technical solutions provided in the implementations of the present specification are described below in detail with reference to the accompanying drawings.

FIG. 1 is a schematic flowchart illustrating an identity identification preprocessing method, according to an implementation of the present specification. The method includes the following steps:

S100: After entering a predetermined nearby area, a mobile device of a user uploads an auxiliary identification factor other than a biometric feature of the owner and an identity of the owner to an identification server based on a received wireless signal.

In the implementations of the present specification, the mobile device of the user is a mobile device carried by the user, such as a mobile phone, a tablet computer, or a notebook computer carried by the user.

A biometric feature collection device is an intelligent device configured to collect a biometric feature of a user. The biometric feature collection device usually has a device identifier. The device identifier can be a physical address (MAC address) of the biometric feature collection device, or can be a universally unique identifier (UUID) of the biometric feature collection device.

Generally, the user needs to reach a location of the biometric feature collection device, to collect a biometric feature in cooperation with a requirement of the biometric feature collection device. For example, the user needs to reach the location of the biometric feature collection device, and faces a camera on the biometric feature collection device, so that the biometric feature collection device collects a facial feature of the user.

It is worthwhile to note that when the user reaches the location of the biometric feature collection device, it means that the user starts to enter an identity identification procedure.

The predetermined nearby area is a predetermined area near the biometric feature collection device. For example, the predetermined nearby area can be a circular area using the biometric feature collection device as a center and using specified distance as a radius. For another example, the predetermined nearby area can be a rectangular area (5 m*5 m) in front of the biometric feature collection device. A far boundary (a boundary relatively far from the biometric feature collection device) of the rectangular area is 12 m away from the biometric feature collection device, and a near boundary (a boundary relatively close to the biometric feature collection device) of the rectangular area is 7 m away from the biometric feature collection device.

In practice, the predetermined nearby area can be specified based on a service requirement. For example, if the identification server wants to obtain the identity of the user five seconds before the user enters the identity identification procedure, it can be determined through calculation based on a common speed of the user (such as 2 m/s) that the near boundary of the predetermined nearby area needs to be 2 m/s*5s=10 m away from the biometric feature collection device.

In the implementations of the present specification, the biometric feature collection device broadcasts the wireless signal to the predetermined nearby area of the biometric feature collection device. Therefore, it can be understood that the predetermined nearby area falls within signal coverage of the biometric feature collection device. The wireless signal broadcast by the biometric feature collection device can include a device identifier of the biometric feature collection device. Another device can identify a device type of the device broadcasting the wireless signal based on the device identifier in the received wireless signal, or can establish a communication connection to the device broadcasting the wireless signal based on the device identifier in the received wireless signal.

The wireless signal broadcast by the biometric feature collection device is used to trigger the mobile device of the user receiving the wireless signal to perform the following predetermined operation: uploading the auxiliary identification factor other than the biometric feature of the owner and the identity of the owner to the identification server.

In the implementations of the present specification, the identity of the owner is usually an identity registered in advance by the owner with the identification server, such as an account number, a mobile phone number, or a nickname.

It is worthwhile to note that a client program corresponding to the identification server can be installed on the mobile device of the user, and the identity registered by the user with the identification server is logged in to the client program. In addition, the mobile device of the user can directly store the identity registered by the user with the identification server.

The auxiliary identification factor of the owner can be specifically a password, a digital certificate, etc. registered by the owner when the owner registers the identity, or can be a one-time password (OTP) on which the identification server and the client program that corresponds to the identification server and that is installed on the mobile device of the user agree, or a time-based one-time password (TOTP).

To be specific, in step S100, the mobile device of the user can invoke the client program based on the received wireless signal; obtain, by using the client program, the identity of owner logged in to the client program and the auxiliary identification factor other than the biometric feature of the owner; and upload the identity and the auxiliary identification factor to the identification server by using the client program.

In the implementations of the present specification, the biometric feature collection device can broadcast a Bluetooth beacon signal to the predetermined nearby area of the biometric feature collection device, or can broadcast a mobile hotspot-based contact Wi-Fi aware signal.

S102. The identification server establishes a mapping relationship between the auxiliary identification factor and the identity.

The identification server establishes the mapping relationship between the auxiliary identification factor and the identity, and the mapping relationship is used to subsequently perform biometric feature-based identity identification on the owner at the biometric feature collection device.

It is worthwhile to note that when the identification server establishes the mapping relationship between the auxiliary identification factor and the identity, in one aspect, it means that validity of the auxiliary identification factor needs to be verified by using auxiliary identification factor verification information associated with the identity; in another aspect, it means that the auxiliary identification factor and a primary identification factor assisted by the auxiliary identification factor should correspond to the same identity.

For example, the auxiliary identification factor is a password provided by the mobile device of the user. As such, in one aspect, the identification server needs to compare a registration password (namely, the auxiliary identification factor verification information) associated with the identity provided by the mobile device of the user with the password provided by the mobile device of the user. If the two passwords are consistent with each other, the identification server determines that the auxiliary identification factor passes validity verification. In another aspect, verification for the primary identification factor is whether the identification server can receive a collected face image matching a registered biometric feature associated with the identity provided by the mobile device of the user. If the identification server can receive the collected face image, the identification server determines that the primary identification factor passes validity verification. When both the primary identification factor and the auxiliary identification factor pass verification, the identity of the user can be identified as an identity corresponding to both the primary identification factor and the auxiliary identification factor.

It should be emphasized that the identification server can verify validity of the auxiliary identification factor at any time before completing identity identification of the owner. For example, the identification server can perform validity verification on the auxiliary identification factor immediately when receiving the identity and the auxiliary identification factor uploaded by the mobile device of the user. For another example, the identification server can verify, after identifying the user identity based on a collected biometric feature, the auxiliary identification factor corresponding to the user identity.

In addition, in the implementations of the present specification, the identification server can release the mapping relationship established in step S102 after specified duration from a time point that the mapping relationship is established. This is because in practice, some users possibly enter the predetermined nearby area and then leave, and identity identification is not performed on the users. Therefore, a validity period (specified duration) is set, and the mapping relationship is released after the validity period expires to release storage resources.

In addition, the identification server possibly correspond to more than one biometric feature collection device. In this case, in step S100, the mobile device of the user extracts the device identifier of the biometric feature collection device from the received wireless signal, and then uploads the device identifier, the auxiliary identification factor other than the biometric feature of the owner, and the identity of the owner to the identification server.

As such, in step S102, the identification server establishes a mapping relationship between the device identifier, the auxiliary identification factor, and the identity.

Figure 2:
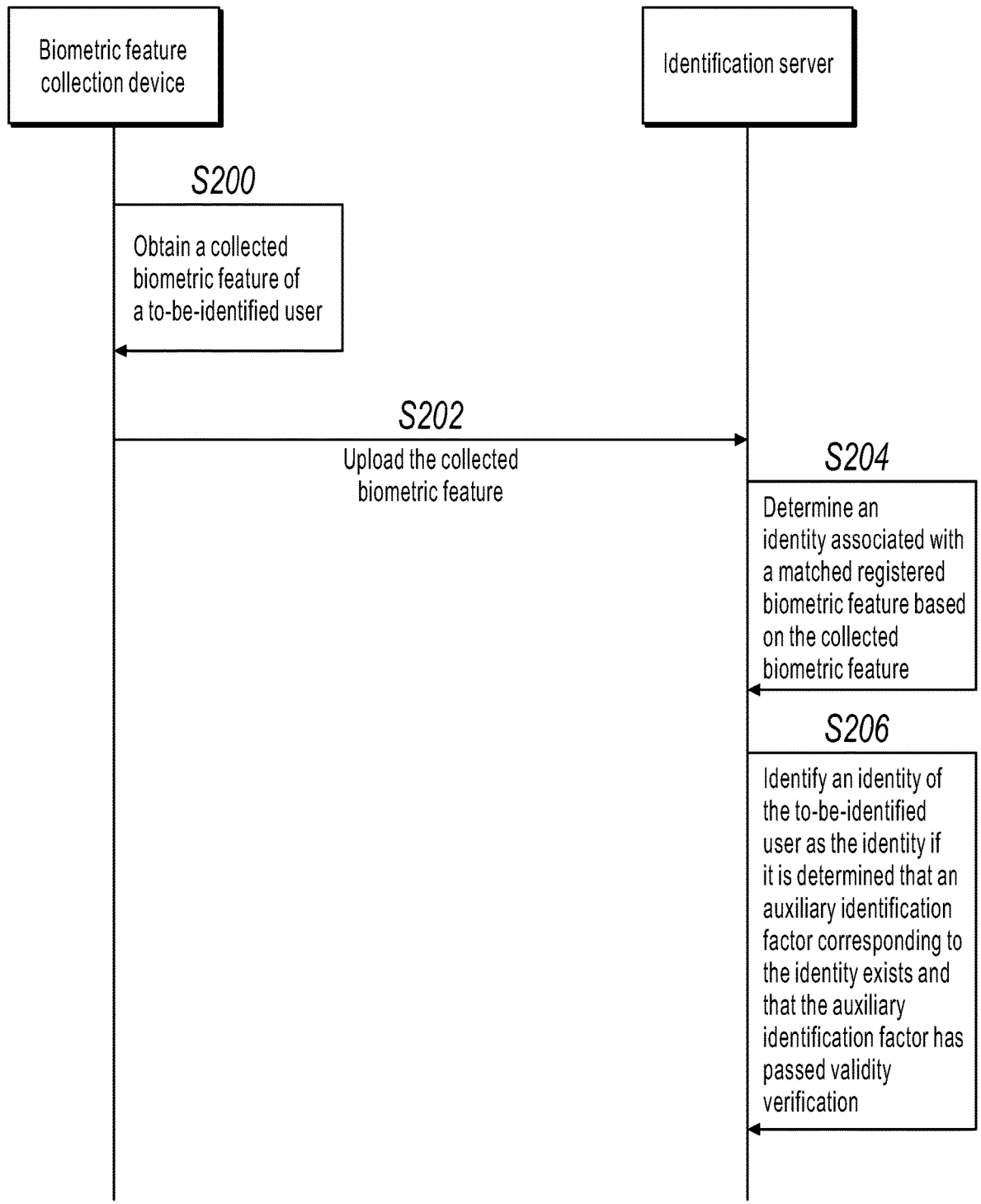
FIG. 2 is a schematic flowchart illustrating an identity identification method, according to an implementation of the present specification.

FIG. 2 is a schematic flowchart illustrating an identity identification method, according to an implementation of the present specification. The method includes the following steps:

S200. A biometric feature collection device collects a biometric feature of a to-be-identified user as a collected biometric feature.

S202. Upload the collected biometric feature to an identification server.

S204. The identification server determines a registered biometric feature matching the collected biometric feature, and determines an identity associated with the matched registered biometric feature.

S206. The identification server identifies an identity of the to-be-identified user as the identity if the identification server determines, based on a pre-established mapping relationship, that an auxiliary identification factor corresponding to the identity exists and that the auxiliary identification factor has passed validity verification.

The identity identification preprocessing method shown in FIG. 1 and the identity identification method shown in FIG. 2 are two processes independent of each other. The same user needs to first undergo the identity identification preprocessing method shown in FIG. 1, and then enter the identity identification method shown in FIG. 2.

For any user, in the identity identification preprocessing method shown in FIG. 1, the user can perform no operation from entering a predetermined nearby area of a biometric feature collection device to arriving at the biometric feature collection device. That is, the user can be unaware of the identity identification preprocessing method shown in FIG. 1.

In addition, after identifying the identity of the to-be-identified user as the identity, the identification server can release the mapping relationship between the identity and the auxiliary identification factor (or release the mapping relationship between the identity, the auxiliary identification factor, and the device identifier). As such, storage resources in the identification server can be released as soon as possible.

In addition, it is worthwhile to note that if the identification server corresponds to a plurality of biometric feature collection devices, in step S202, the biometric feature collection device further needs to upload the device identifier of the biometric feature collection device to the identification server. As such, it can be ensured that if the identification server receives a collected biometric feature uploaded by a biometric feature collection device A, and determines an identity associated with a matched registered biometric feature based on the collected biometric feature, the identification server can ensure that the auxiliary identification factor corresponding to both the biometric feature collection device A and the identity to perform auxiliary identification should be used.

Specifically, in step S202, the biometric feature collection device uploads the device identifier of the biometric feature collection device and the collected biometric feature to the identification server. In step S206, the identification server identifies the identity of the to-be-identified user as the identity if the identification server determines, based on the pre-established mapping relationship, that the auxiliary identification factor corresponding to the identity and the device identifier exists and that the auxiliary identification factor has passed validity verification.

In addition, it should be emphasized that step S204 actually can be considered as performing identity identification on the to-be-identified user based on a single factor (biometric feature). For this purpose, the implementations of the present specification further provide a biometric feature-based identity identification preprocessing method and a biometric feature-based identity identification method.

The biometric feature-based identity identification preprocessing method is provided.

A biometric feature collection device broadcasts a wireless signal to a predetermined nearby area of the biometric feature collection device, and the method includes: after entering the predetermined nearby area, providing, by a mobile device of a user, a pre-stored identity of the owner to an identification server based on the received wireless signal; and determining, by the identification server, a registered biometric feature associated with the identity from a stored registered biometric feature set, and adding the determined registered biometric feature to a selected feature set, where the selected feature set is used to perform biometric feature-based identity identification on the owner at the biometric feature collection device.

A client program corresponding to the identification server is installed on the mobile device of the user.

The providing, by a mobile device of a user, a pre-stored identity of the owner to an identification server based on the received wireless signal specifically includes: sending, by the mobile device of the user, the identity of the owner logged in to the client program to the identification server by using the installed client program.

The identification server corresponds to more than one biometric feature collection device.

The sending, by the mobile device of the user, the pre-stored identity of the owner to the identification server by using the installed client program specifically includes: extracting, by the mobile device of the user, a device identifier of the biometric feature collection device from the received wireless signal; and sending, by the mobile device of the user, the device identifier and the pre-stored identity of the owner to the identification server by using the installed client program.

The providing, by a mobile device of a user, a pre-stored identity of the owner to an identification server based on the received wireless signal specifically includes: extracting, by the mobile device of the user, a device identifier of the biometric feature collection device from the received wireless signal; and establishing, by the mobile device of the user, a communication connection to the biometric feature collection device based on the device identifier; sending, by the mobile device of the user, the pre-stored identity of the owner to the biometric feature collection device by using the communications connection; and uploading, by the biometric feature collection device, the identity to the identification server.

The broadcasting, by a biometric feature collection device, a wireless signal to a predetermined nearby area of the biometric feature collection device specifically includes: broadcasting, by the biometric feature collection device, a Bluetooth beacon signal to the predetermined nearby area of the biometric feature collection device.

The establishing, by the mobile device of the user, a communication connection to the biometric feature collection device based on the device identifier specifically includes: establishing, by the mobile device of the user, a Bluetooth connection to the biometric feature collection device based on the device identifier.

The establishing, by the mobile device of the user, a communication connection to the biometric feature collection device based on the device identifier specifically includes: determining, by the mobile device of the user, a device type corresponding to the device identifier based on the device identifier; and if it is determined that the device type corresponding to the device identifier is the biometric feature collection device, establishing a communication connection to the biometric feature collection device based on the device identifier.

The identification server corresponds to more than one biometric feature collection device.

The uploading, by the biometric feature collection device, the identity to the identification server specifically includes: uploading, by the biometric feature collection device, a device identifier of the biometric feature collection device and the identity to the identification server.

The adding the determined registered biometric feature to the selected feature set specifically includes: adding the determined registered biometric feature to a selected feature set corresponding to the device identifier.

The method further includes: deleting, by the identification server, the determined registered biometric feature from the selected feature set after specified duration from a time point that the determined registered biometric feature is added to the selected feature set.

The biometric feature-based identity identification method includes: collecting, by a biometric feature collection device, a biometric feature of a to-be-identified user as a collected biometric feature, and uploading the collected biometric feature to an identification server; and determining, by the identification server, whether a registered biometric feature matching the collected biometric feature exists in a selected feature set; and if the matched registered biometric feature exists in the selected feature set, identifying an identity of the to-be-identified user as an identity associated with the matched registered biometric feature.

The uploading, by the biometric feature collection device, the collected biometric feature to an identification server specifically includes: uploading, by the biometric feature collection device, a device identifier of the biometric feature collection device and the collected biometric feature to the identification server.

The determining, by the identification server, whether a registered biometric feature matching the collected biometric feature exists in a selected feature set specifically includes: determining, by the identification server, whether the registered biometric feature matching the collected biometric feature exists in a selected feature set corresponding to the device identifier.

The method further includes: if the matched registered biometric feature does not exist in the selected feature set, determining, by the identification server, whether the registered biometric feature matching the collected biometric feature exists in a stored registered biometric feature set; and if the registered biometric feature matching the collected biometric feature exists in the registered biometric feature set, identifying, by the identification server, the identity of the to-be-identified user as the identity associated with the matched registered biometric feature; or determining, by the identification server, that the identification fails if the registered biometric feature matching the collected biometric feature does not exist in the registered biometric feature set.

The method further includes: deleting, by the identification server, the matched registered biometric feature from the selected feature set after identifying the identity of the to-be-identified user as the identity associated with the matched registered biometric feature.

Figure 3:
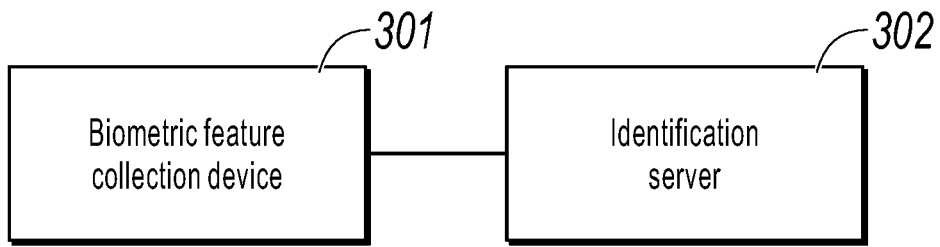
FIG. 3 shows a system architecture diagram, according to an implementation of the present specification.

FIG. 3 shows a system architecture diagram, according to an implementation of the present specification, and the system architecture diagram includes a biometric feature collection device 301 and an identification server 302. The system architecture diagram can be specifically implemented as an identity identification preprocessing system and/or an identity identification system.

The identity identification preprocessing system includes a biometric feature collection device and an identification server.

The biometric feature collection device is configured to broadcast a wireless signal to a predetermined nearby area of the biometric feature collection device, so that after entering the predetermined nearby area, a mobile device of a user uploads an auxiliary identification factor other than a biometric feature of the owner and an identity of the owner to the identification server based on the received wireless signal.

The identification server is configured to establish a mapping relationship between the auxiliary identification factor and the identity, where the mapping relationship is used to perform biometric feature-based identity identification on the owner at the biometric feature collection device.

The identity identification system includes a biometric feature collection device and an identification server.

The biometric feature collection device is configured to: collect a biometric feature of a to-be-identified user as a collected biometric feature, and upload the collected biometric feature to the identification server.

The identification server is configured to: determine a registered biometric feature matching the collected biometric feature, determine an identity associated with the matched registered biometric feature, and identify an identity of the to-be-identified user as the identity if the identification server determines, based on a pre-established mapping relationship, that an auxiliary identification factor corresponding to the identity exists and that the auxiliary identification factor has passed validity verification.

Figure 4:
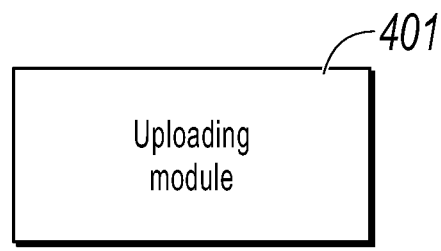
FIG. 4 is a schematic structural diagram illustrating a mobile device of a user, according to an implementation of the present specification.

FIG. 4 is a schematic structural diagram illustrating a mobile device of a user, according to an implementation of the present specification. A biometric feature collection device broadcasts a wireless signal to a predetermined nearby area of the biometric feature collection device, and the mobile device of the user includes: an uploading module 401, configured to upload an auxiliary identification factor other than a biometric feature of the owner and an identity of the owner to an identification server based on the received wireless signal after the mobile device of the user enters the predetermined nearby area, so that the identification server establishes a mapping relationship between the auxiliary identification factor and the identity, where the mapping relationship is used to perform biometric feature-based identity identification on the owner at the biometric feature collection device.

Figure 5:
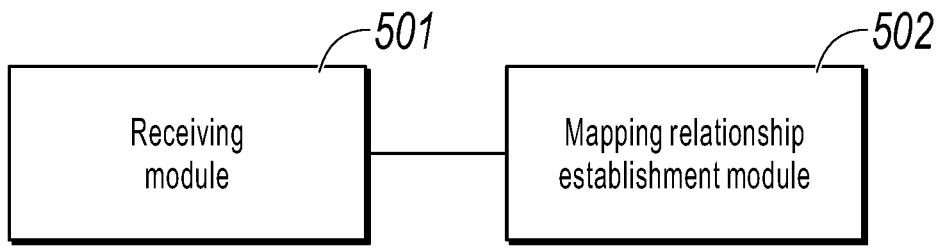
FIG. 5 is a schematic structural diagram illustrating an identification server, according to an implementation of the present specification.

FIG. 5 is a schematic structural diagram illustrating an identification server, according to an implementation of the present specification. A biometric feature collection device broadcasts a wireless signal to a predetermined nearby area of the biometric feature collection device, and the identification server includes: a receiving module 501, configured to receive an auxiliary identification factor other than a biometric feature of an owner and an identity of the owner that are uploaded by a mobile device of a user based on the received wireless signal after the mobile device of the user enters the predetermined nearby area; and a mapping relationship establishment module 502, configured to establish a mapping relationship between the auxiliary identification factor and the identity, where the mapping relationship is used to perform biometric feature-based identity identification on the owner at the biometric feature collection device.

Figure 6:
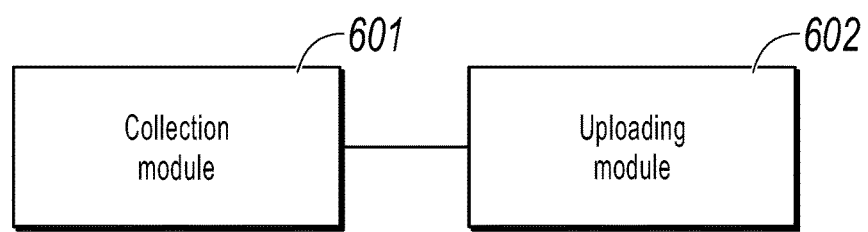
FIG. 6 is a schematic structural diagram illustrating a biometric feature collection device, according to an implementation of the present specification.

FIG. 6 is a schematic structural diagram illustrating a biometric feature collection device, according to an implementation of the present specification. The biometric feature collection device includes: a collection module 601, configured to collect a biometric feature of a to-be-identified user as a collected biometric feature; and an uploading module 602, configured to upload the collected biometric feature to an identification server, so that the identification server determines a registered biometric feature matching the collected biometric feature, determines an identity associated with the matched registered biometric feature, and determines an identity of the to-be-identified user as the identity if the identification server determines, based on a pre-established mapping relationship, that an auxiliary identification factor corresponding to the identity exists and that the auxiliary identification factor has passed validity verification.

Figure 7:
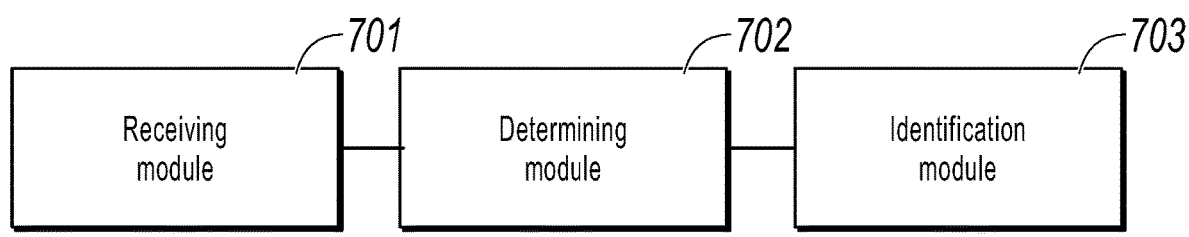
FIG. 7 is a schematic structural diagram illustrating an identification server, according to an implementation of the present specification.

FIG. 7 is a schematic structural diagram illustrating an identification server, according to an implementation of the present specification. The identification server includes: a receiving module 701, configured to receive a collected biometric feature uploaded by a biometric feature collection device, where the collected biometric feature is obtained by the biometric feature collection device by collecting a biometric feature of a to-be-identified user; a determining module 702, configured to: determine a registered biometric feature matching the collected biometric feature, and determine an identity associated with the matched registered biometric feature; and an identification module 703, configured to identify an identity of the to-be-identified user as the identity if the identification server determines, based on a pre-established mapping relationship, that an auxiliary identification factor corresponding to the identity exists and that the auxiliary identification factor has passed validity verification.

An implementation of the present specification further provides a computer device. The computer device includes at least a memory, a processor, and a computer program that is stored in the memory and that can run on the processor. When executing the program, the processor performs the method in FIG. 1 or FIG. 2.

Figure 8:
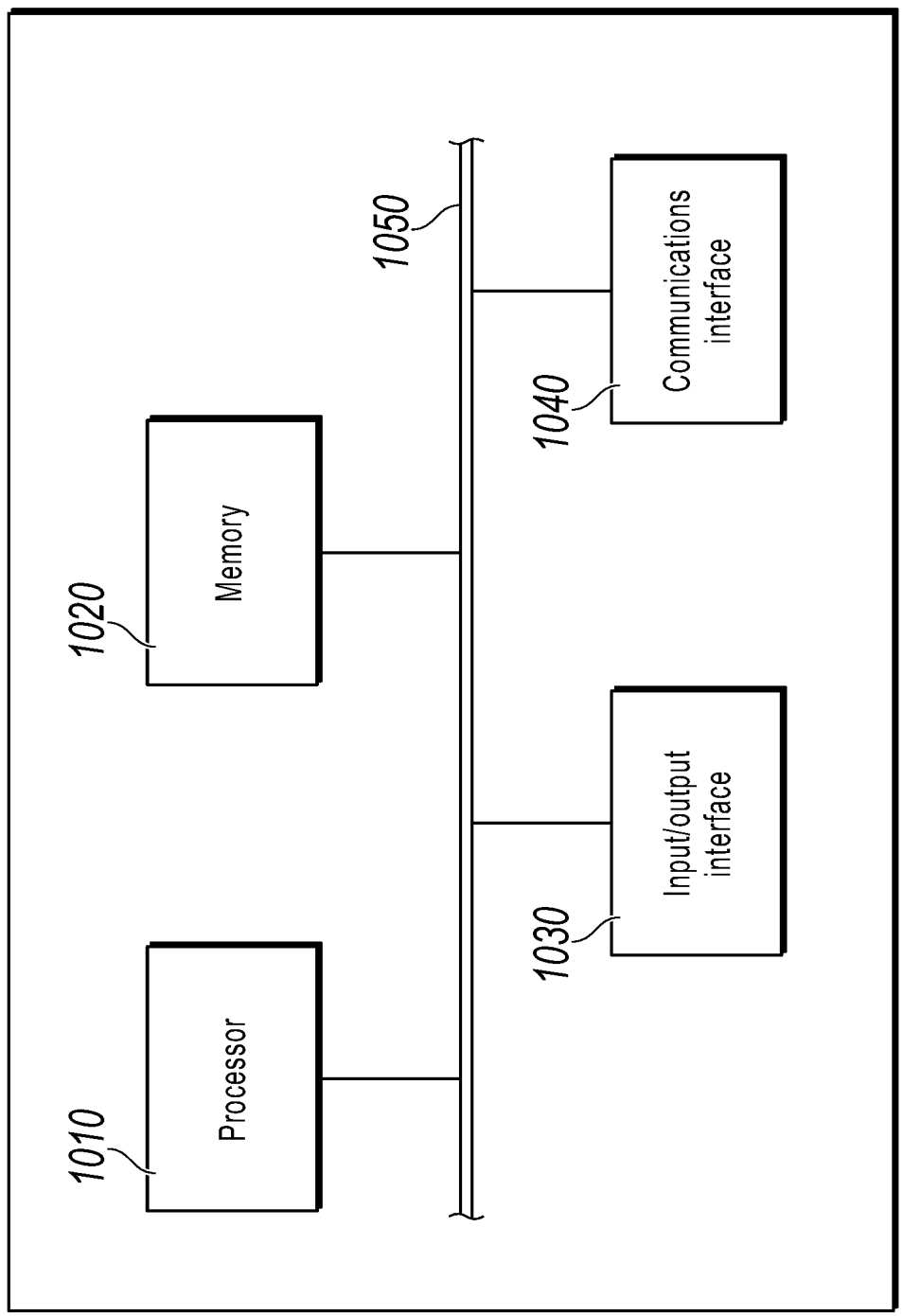
FIG. 8 is a schematic structural diagram illustrating a device used to configure the method in an implementation of the present specification.

FIG. 8 is a schematic structural diagram illustrating a more specific hardware structure of a computing device, according to an implementation of the present specification. The device can include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 can be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 can be implemented in a form of a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module (not shown in the figure) can be configured as a component in the device, or can be externally connected to the device to provide corresponding functions. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), so as to implement communication and interaction between the device and another device. The communications module can implement communication in a wired method (for example, a USB or a network cable), or can implement communication in a wireless method (for example, a mobile network, Wi-Fi, or Bluetooth).

The bus 1050 includes a channel for transmitting information between components (for example, the processor 1010, the memory 1020, the input/output interface 1030, and the communications interface 1040) of the device.

It is worthwhile to note that though the previous device shows only the processor 1010, the memory 1020, the input/output interface 1030, the communications interface 1040, and the bus 1050, in a specific implementation process, the device can further include another component required to implement normal operation. In addition, a person skilled in the art may understand that the previous device may include only components required to implement the solutions in the implementations of the present specification, and does not need to include all the components shown in the figure.

An implementation of the present specification further provides a computer readable storage medium. The computer readable storage medium stores a computer program, and when a processor executes the program, the method shown in FIG. 1 or FIG. 2 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a serving device, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method comprising:
   receiving, by an identification server, a wireless signal, wherein the wireless signal is broadcasted by a biometric feature collection device to a predetermined nearby area of the biometric feature collection device;
   obtaining, based on the received wireless signal, an auxiliary identification factor other than a biometric feature of a user and an identity of the user wherein the auxiliary identification factor and the identity of the user are uploaded by a mobile device of the user using a client program installed on the mobile device, and wherein the auxiliary identification factor and the identity of the user are extracted using the client program installed on the mobile device of the user;
   establishing, by the identification server, a mapping relationship between the auxiliary identification factor and the identity, wherein the mapping relationship is used to perform biometric feature-based identity identification on the user at the biometric feature collection device; and
   releasing, by the identification server, the mapping relationship based on a given condition.

2. The computer-implemented method of claim 1, wherein the identification server corresponds to more than one biometric feature collection device, and, wherein obtaining, based on the received wireless signal, an auxiliary identification factor other than a biometric feature of the user and an identity of the user comprises:
   receiving, by the identification server, a device identifier, the auxiliary identification factor other than the biometric feature of the user, and the identity of the user to the identification server, wherein the device identifier corresponds to the biometric feature collection device and is extracted by the mobile device of the user; and,
   wherein establishing, by the identification server, a mapping relationship between the auxiliary identification factor and the identity comprises:
   establishing, by the identification server, a mapping relationship between the device identifier, the auxiliary identification factor, and the identity.

3. The computer-implemented method of claim 1, wherein receiving, by an identification server, a wireless signal, wherein the wireless signal is broadcasted by a biometric feature collection device to a predetermined nearby area of the biometric feature collection device comprises:
   receiving, by the identification server, the wireless signal, wherein the wireless signal is a Bluetooth beacon signal emitted from the biometric feature collection device to the predetermined nearby area of the biometric feature collection device; or
   receiving, by the identification server, the wireless signal, wherein the wireless signal is a mobile hotspot-based contact Wi-Fi aware signal emitted from the biometric feature collection device to the predetermined nearby area of the biometric feature collection device.

4. The computer-implemented method of claim 1, wherein releasing the mapping relationship based on a given condition comprises:
   releasing, by the identification server, the mapping relationship after a specified duration from a time point corresponding to a time when the mapping relationship is established.

5. The computer-implemented method of claim 1, further comprising:
   receiving a biometric feature of the user as a collected biometric feature, wherein the biometric feature of the user is collected by the biometric feature collection device;
   determining, by the identification server, a registered biometric feature matching the collected biometric feature, and determining an identity associated with the matched registered biometric feature; and determining, based on the mapping relationship, the auxiliary identification factor corresponding to the identity exists and the auxiliary identification factor has passed validity verification; and responsive to determining the auxiliary identification factor corresponding to the identity exists and the auxiliary identification factor has passed validity verification, identifying, by the identification server, the identity of the user as the identity.

6. The computer-implemented method of claim 5, wherein the client program corresponds to the identification server and is installed on the mobile device of the user;

wherein receiving a biometric feature of the user as a collected biometric feature comprises:

receiving a device identifier of the biometric feature collection device and the collected biometric feature; and wherein identifying, by the identification server, the identity of the user as the identity comprises:

determining, based on the mapping relationship, the auxiliary identification factor corresponding to the identity and the device identifier exists and the auxiliary identification factor has passed validity verification; and identifying, by the identification server, the identity of the user as the identity.

7. The computer-implemented method of claim 5, wherein releasing the mapping relationship based on a given condition comprises:

releasing, by the identification server, the mapping relationship between the identity and the auxiliary identification factor after identifying the identity of the user as the identity.

8. A non-transitory, computer-readable medium storing one or more instructions executable by a computer system to perform operations comprising:

receiving, by an identification server, a wireless signal, wherein the wireless signal is broadcasted by a biometric feature collection device to a predetermined nearby area of the biometric feature collection device;

obtaining, based on the received wireless signal, an auxiliary identification factor other than a biometric feature of a user and an identity of the user wherein the auxiliary identification factor and the identity of the user are uploaded by a mobile device of the user using a client program installed on the mobile device, and wherein the auxiliary identification factor and the identity of the user are extracted using the client program installed on the mobile device of the user;

establishing, by the identification server, a mapping relationship between the auxiliary identification factor and the identity, wherein the mapping relationship is used to perform biometric feature-based identity identification on the user at the biometric feature collection device; and releasing, by the identification server, the mapping relationship based on a given condition.

9. The non-transitory, computer-readable medium of claim 8, wherein the identification server corresponds to more than one biometric feature collection device, and, wherein obtaining, based on the received wireless signal, an auxiliary identification factor other than a biometric feature of the user and an identity of the user comprises:

receiving, by the identification server, a device identifier, the auxiliary identification factor other than the biometric feature of the user, and the identity of the user to the identification server, wherein the device identifier corresponds to the biometric feature collection device and is extracted by the mobile device of the user; and, wherein establishing, by the identification server, a mapping relationship between the auxiliary identification factor and the identity comprises:

establishing, by the identification server, a mapping relationship between the device identifier, the auxiliary identification factor, and the identity.

10. The non-transitory, computer-readable medium of claim 8, wherein receiving, by an identification server, a wireless signal, wherein the wireless signal is broadcasted by a biometric feature collection device to a predetermined nearby area of the biometric feature collection device comprises:

receiving, by the identification server, the wireless signal, wherein the wireless signal is a Bluetooth beacon signal emitted from the biometric feature collection device to the predetermined nearby area of the biometric feature collection device; or receiving, by the identification server, the wireless signal, wherein the wireless signal is a mobile hotspot-based contact Wi-Fi aware signal emitted from the biometric feature collection device to the predetermined nearby area of the biometric feature collection device.

11. The non-transitory, computer-readable medium of claim 8, wherein releasing the mapping relationship based on a given condition comprises:

releasing, by the identification server, the mapping relationship after a specified duration from a time point corresponding to a time when the mapping relationship is established.

12. The non-transitory, computer-readable medium of claim 8, further comprising:

receiving a biometric feature of the user as a collected biometric feature, wherein the biometric feature of the user is collected by the biometric feature collection device;

determining, by the identification server, a registered biometric feature matching the collected biometric feature, and determining an identity associated with the matched registered biometric feature; and determining, based on the mapping relationship, the auxiliary identification factor corresponding to the identity exists and the auxiliary identification factor has passed validity verification; and responsive to determining the auxiliary identification factor corresponding to the identity exists and the auxiliary identification factor has passed validity verification, identifying, by the identification server, the identity of the user as the identity.

13. The non-transitory, computer-readable medium of claim 12, wherein the client program corresponds to the identification server and is installed on the mobile device of the user;

wherein receiving a biometric feature of the user as a collected biometric feature comprises:

receiving a device identifier of the biometric feature collection device and the collected biometric feature; and wherein identifying, by the identification server, the identity of the user as the identity comprises:

determining, based on the mapping relationship, the auxiliary identification factor corresponding to the identity and the device identifier exists and the auxiliary identification factor has passed validity verification; and identifying, by the identification server, the identity of the user as the identity.

14. The non-transitory, computer-readable medium of claim 12, wherein releasing the mapping relationship based on a given condition comprises:
    releasing, by the identification server, the mapping relationship between the identity and the auxiliary identification factor after identifying the identity of the user as the identity.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    receiving, by an identification server, a wireless signal, wherein the wireless signal is broadcasted by a biometric feature collection device to a predetermined nearby area of the biometric feature collection device;
    obtaining, based on the received wireless signal, an auxiliary identification factor other than a biometric feature of a user and an identity of the user wherein the auxiliary identification factor and the identity of the user are uploaded by a mobile device of the user using a client program installed on the mobile device, and wherein the auxiliary identification factor and the identity of the user are extracted using the client program installed on the mobile device of the user;
    establishing, by the identification server, a mapping relationship between the auxiliary identification factor and the identity, wherein the mapping relationship is used to perform biometric feature-based identity identification on the user at the biometric feature collection device; and
    releasing, by the identification server, the mapping relationship based on a given condition.

16. The computer-implemented system of claim 15, wherein the identification server corresponds to more than one biometric feature collection device, and, wherein obtaining, based on the received wireless signal, an auxiliary identification factor other than a biometric feature of the user and an identity of the user comprises:
    receiving, by the identification server, a device identifier, the auxiliary identification factor other than the biometric feature of the user, and the identity of the user to the identification server, wherein the device identifier corresponds to the biometric feature collection device and is extracted by the mobile device of the user; and,
    wherein establishing, by the identification server, a mapping relationship between the auxiliary identification factor and the identity comprises:
    establishing, by the identification server, a mapping relationship between the device identifier, the auxiliary identification factor, and the identity.

17. The computer-implemented system of claim 15, wherein receiving, by an identification server, a wireless signal, wherein the wireless signal is broadcasted by a biometric feature collection device to a predetermined nearby area of the biometric feature collection device comprises:
    receiving, by the identification server, the wireless signal, wherein the wireless signal is a Bluetooth beacon signal emitted from the biometric feature collection device to the predetermined nearby area of the biometric feature collection device; or
    receiving, by the identification server, the wireless signal, wherein the wireless signal is a mobile hotspot-based contact Wi-Fi aware signal emitted from the biometric feature collection device to the predetermined nearby area of the biometric feature collection device.

18. The computer-implemented system of claim 15, wherein releasing the mapping relationship based on a given condition comprises:
    releasing, by the identification server, the mapping relationship after a specified duration from a time point corresponding to a time when the mapping relationship is established.

19. The computer-implemented system of claim 15, further comprising:
    receiving a biometric feature of the user as a collected biometric feature, wherein the biometric feature of the user is collected by the biometric feature collection device;
    determining, by the identification server, a registered biometric feature matching the collected biometric feature, and determining an identity associated with the matched registered biometric feature; and
    determining, based on the mapping relationship, the auxiliary identification factor corresponding to the identity exists and the auxiliary identification factor has passed validity verification; and
    responsive to determining the auxiliary identification factor corresponding to the identity exists and the auxiliary identification factor has passed validity verification, identifying, by the identification server, the identity of the user as the identity.

20. The computer-implemented system of claim 19, wherein the client program corresponds to the identification server and is installed on the mobile device of the user;
    wherein receiving a biometric feature of the user as a collected biometric feature comprises:
    receiving a device identifier of the biometric feature collection device and the collected biometric feature; and
    wherein identifying, by the identification server, the identity of the user as the identity comprises:
    determining, based on the mapping relationship, the auxiliary identification factor corresponding to the identity and the device identifier exists and the auxiliary identification factor has passed validity verification; and
    identifying, by the identification server, the identity of the user as the identity.

21. The computer-implemented system of claim 19, wherein releasing the mapping relationship based on a given condition comprises:
    releasing, by the identification server, the mapping relationship between the identity and the auxiliary identification factor after identifying the identity of the user as the identity.

* * * * *

UNITED STATES PATENT AND TRADEMARK OFFICE
CERTIFICATE OF CORRECTION

PATENT NO. : 10,778,678 B2  
APPLICATION NO. : 16/805269  
DATED : September 15, 2020  
INVENTOR(S) : Song et al.

Page 1 of 1

It is certified that error appears in the above-identified patent and that said Letters Patent is hereby corrected as shown below:

On the Title Page

Item (30) - Under Foreign Application priority data, delete "Jul. 18, 2018" and insert -- Jul. 18, 2019 -- therefor.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*